No. 722,098. PATENTED MAR. 3, 1903.
J. E. GLEASON.
GEAR PLANER.
APPLICATION FILED MAY 22, 1902.
NO MODEL. 4 SHEETS—SHEET 1.

No. 722,098. PATENTED MAR. 3, 1903.
J. E. GLEASON.
GEAR PLANER.
APPLICATION FILED MAY 22, 1902.
NO MODEL. 4 SHEETS—SHEET 2.

Attest:
M. B. Smith
C. M. Williams

Inventor:
James E. Gleason
By E. B. Whitmore, Atty.

No. 722,098. PATENTED MAR. 3, 1903.
J. E. GLEASON.
GEAR PLANER.
APPLICATION FILED MAY 22, 1902.
NO MODEL. 4 SHEETS—SHEET 3.
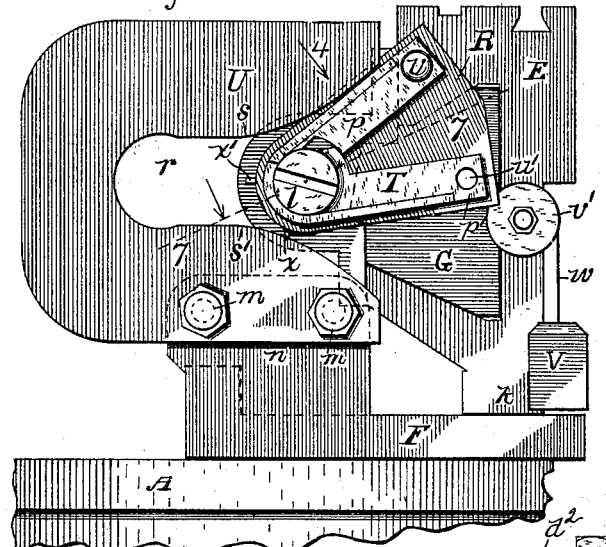
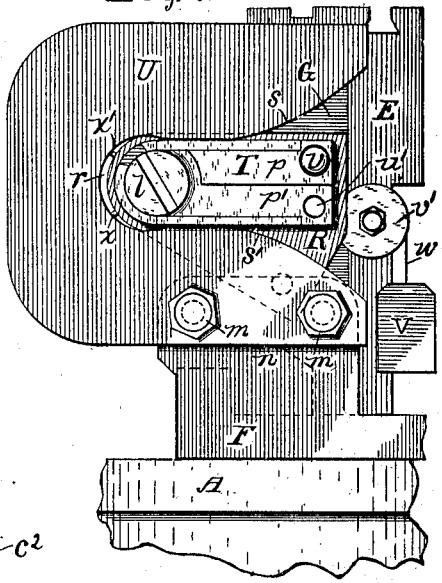
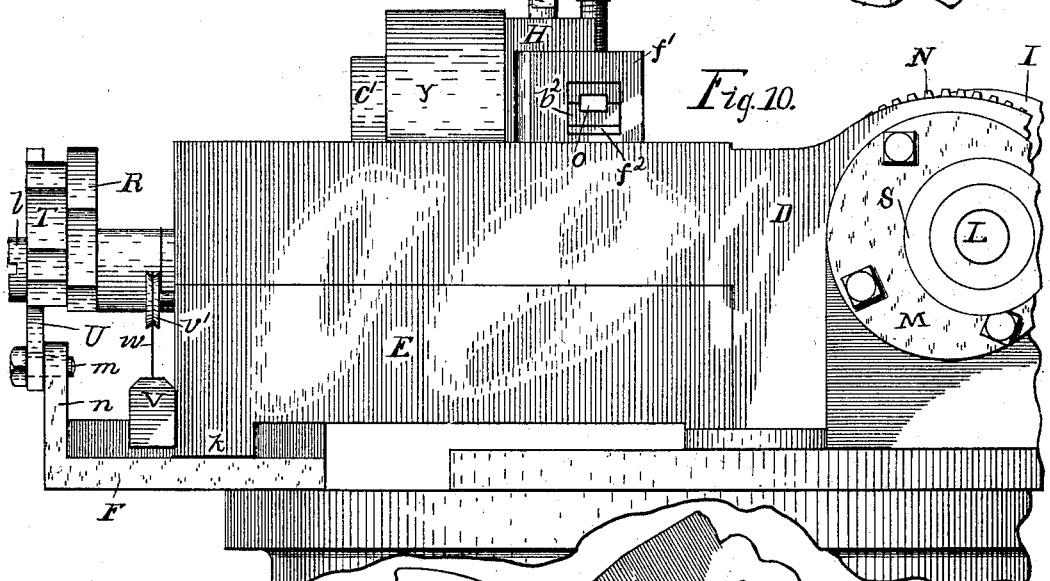
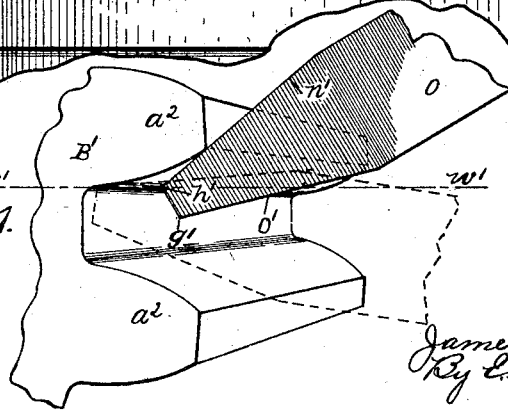
Attest:
M. B. Smith.
L. M. Williams
Inventor
James E. Gleason.
By E. B. Whitmore, Atty.

No. 722,098. PATENTED MAR. 3, 1903.
J. E. GLEASON.
GEAR PLANER.
APPLICATION FILED MAY 22, 1902.
NO MODEL. 4 SHEETS—SHEET 4.

Attest:
M. B. Smith,
L. N. Williams

Inventor:
James E. Gleason,
By E. B. Whitmore, Atty.

United States Patent Office.

JAMES E. GLEASON, OF ROCHESTER, NEW YORK, ASSIGNOR TO THE GLEASON WORKS, OF ROCHESTER, NEW YORK.

GEAR-PLANER.

SPECIFICATION forming part of Letters Patent No. 722,098, dated March 3, 1903.

Application filed May 22, 1902. Serial No. 108,580. (No model.)

*To all whom it may concern:*

Be it known that I, JAMES E. GLEASON, of Rochester, in the county of Monroe and State of New York, have invented a new and useful Improvement in Gear-Planers, which improvement is fully set forth in the following specification and shown in the accompanying drawings.

My invention relates to gear-planers generally, but more particularly to machines for forming the teeth of bevel-gears; and the invention consists in an improvement upon the gear-planer shown and set forth in Letters Patent No. 678,337, granted to W. Gleason and J. E. Gleason July 9, 1901.

The main object of my present invention is to provide mechanism whereby the cutting-tool for forming the teeth will be automatically rocked or tilted as it is carried forward by the feed mechanism from the point toward the bottom of the tooth for the purpose of giving the teeth the exact curvature and form required. This rocking or tilting of the tool is effected in the plane of its axis and at right angles with the horizontal center line of the machine. When the tool begins its work on the upper face of a tooth and at the point thereof, its point is inclined upward; but as the tool progresses it approaches a horizontal position, the point of the tool inclining downward when the base of the tooth is reached. In working upon the under face of the tooth these positions of inclination of the tool are reversed.

The invention is hereinafter fully described, and more particularly pointed out in the claims, reference being had to the accompanying drawings, forming a part of this specification.

Figure 1:
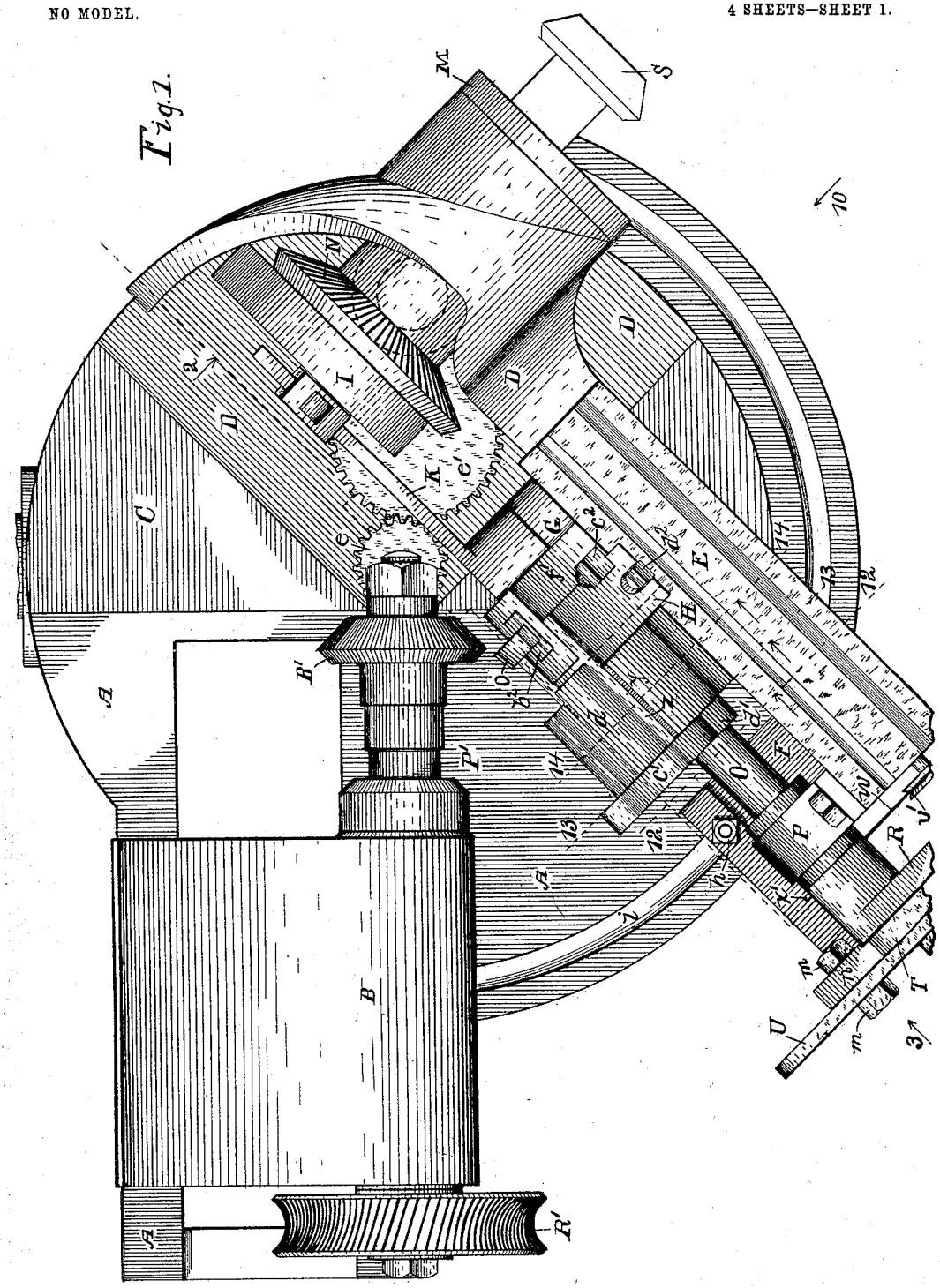
Figure 2:
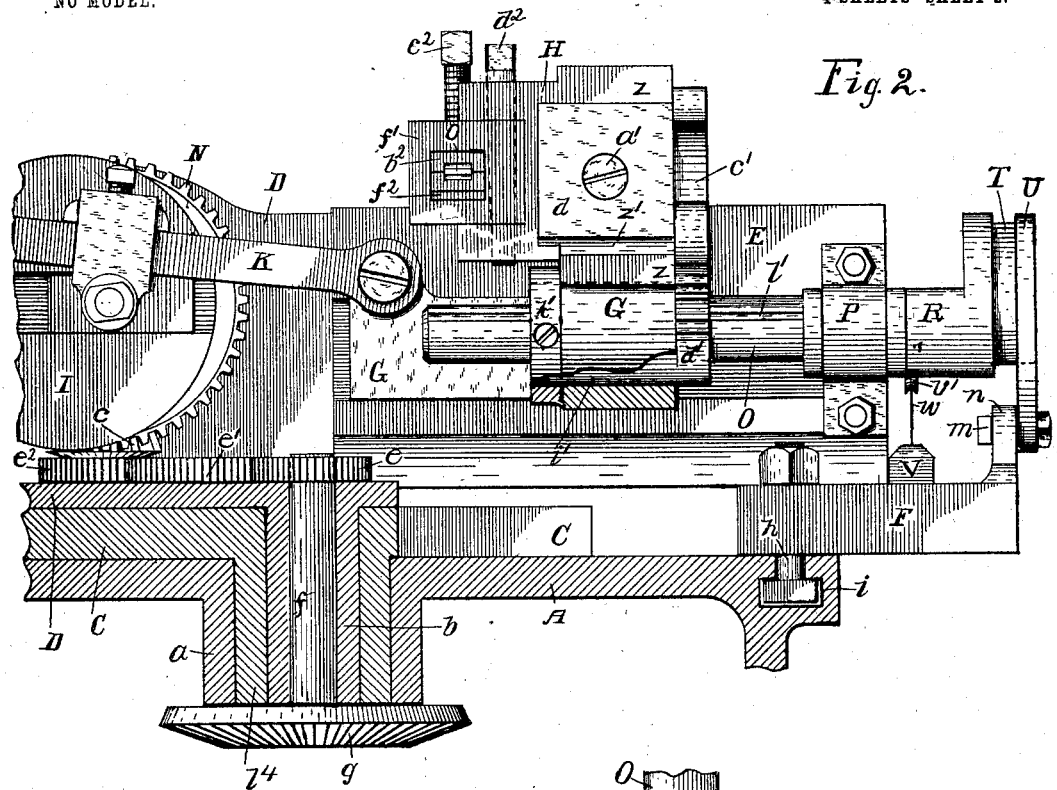
Figure 3:
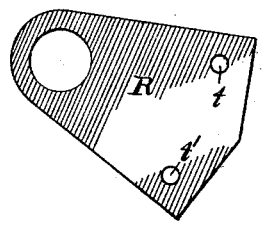
Figure 5:
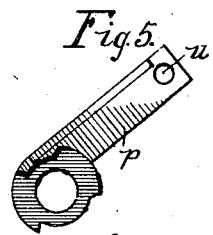
Figure 4:
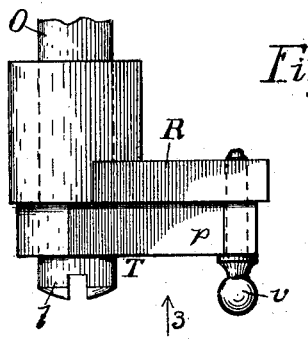
Figure 6:
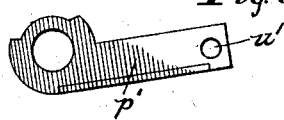
Figure 7:
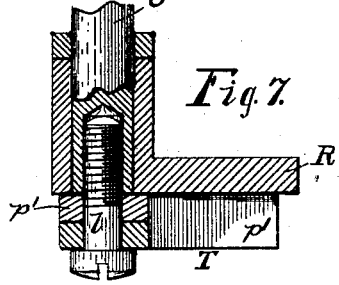
Figure 12:
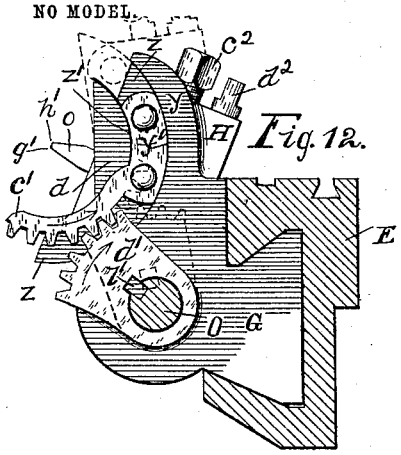
Figure 13:
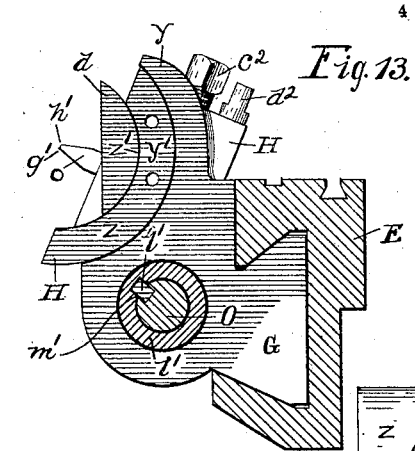
Figure 16:
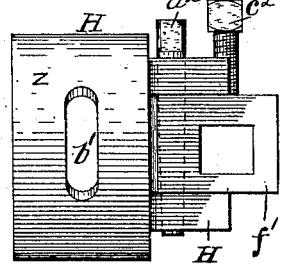
Figure 14:
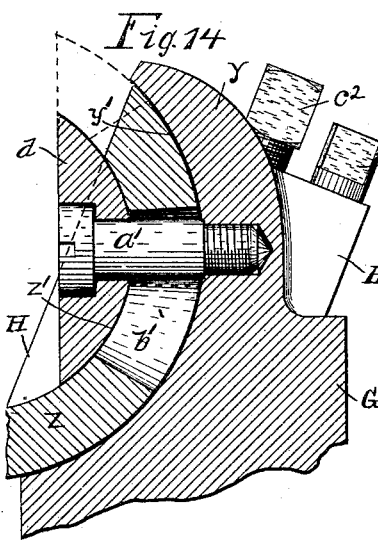
Figure 15:
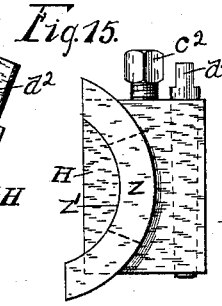
Figure 17:
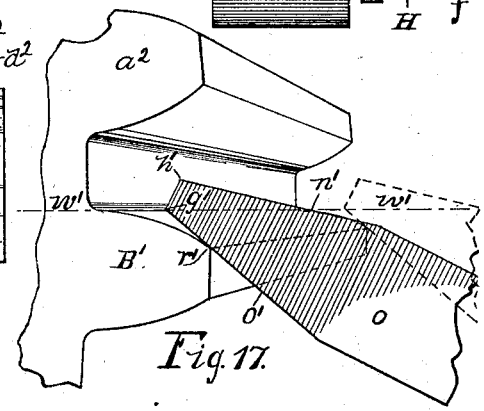
Figure 18:
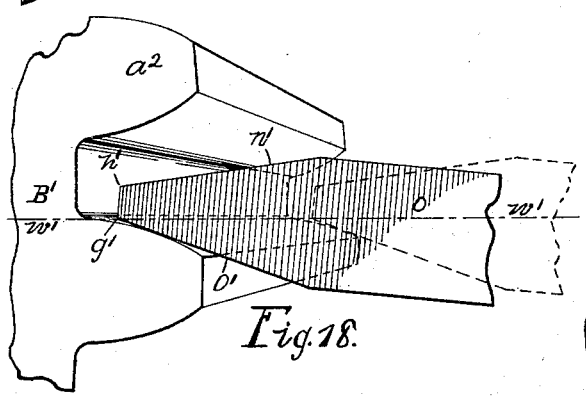
Figure 19:
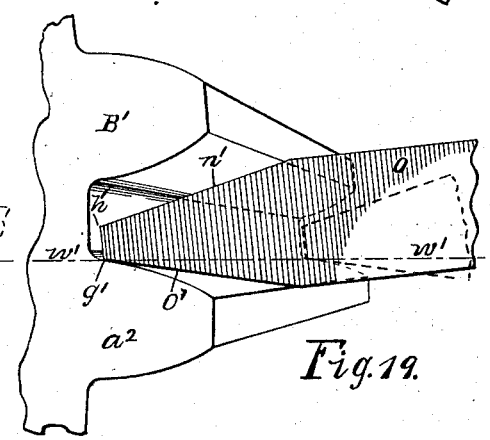

Figure 1 is a plan of a gear-planer similar to that shown in said Letters Patent No. 678,337, with my improved mechanism for rocking the tool in place thereon. Fig. 2 is an elevation of parts seen as indicated by arrow 2 in Fig. 1, the vertical section of the frame and associated parts being taken on the broken dotted line at the point of the arrow. Fig. 3 is a face view of the flare-arm seen as indicated by arrow 3 in Figs. 1 and 4. Fig. 4 is a view of the flare-arm and the form-rider seen as indicated by arrow 4 in Fig. 8. Figs. 5 and 6 are face views of the two branches, respectively, of the form-rider separate and detached. Fig. 7 is an axial section of the form-rider and associated parts at the end of the tilting shaft, taken on the dotted line 7 7 in Fig. 8. Fig. 8 is a view at the end of the tool-carrying arm, showing the parts when the tool is about to commence work upon the upper face of a tooth, the view being indicated by arrow 3 in Fig. 1. Fig. 9 is a view similar to Fig. 8, showing the parts when the tool has completed its work on the side of a tooth. Fig. 10 is a view of the tool-carrying arm and associated parts seen as indicated by arrow 10 in Fig. 1, parts being broken away. Fig. 11 shows different positions of the cutting-tool when working on the under face of a tooth. Fig. 12 is a transverse section of the tool-carrying arm and the tilting shaft, taken as on the dotted line 12 12 in Fig. 1, parts being shown in two positions each by full and dotted lines. Fig. 13 is a transverse section of the tool-carrying arm and other parts, taken on the dotted line 13 13 in Fig. 1. Fig. 14 is a transverse section of the tool-stock and a portion of the slide through the axis of the clamping-bolt, taken on the dotted line 14 14 in Fig. 1. Fig. 15 is a side elevation of the tool-stock detached. Fig. 16 is a rear elevation of the tool-stock detached and the tool-box, showing the slot and other manners of construction of the parts. Figs. 17, 18, and 19 show, respectively, in full and in dotted lines the positions of the tool at the beginning and at the finish of a single stroke or cut, showing also the progress of the tool from the point to the root of the tooth.

Figs. 1, 2, 10, 12, 13, 15, and 16 are drawn to a scale smaller, and Figs. 4, 11, 14, 17, 18, and 19 to various scales larger, than that of Figs. 3, 5, 6, 7, 8, and 9.

Referring to the parts shown, A, Figs. 1 and 2, is the frame of the machine, and B the head-block, adapted to be shifted longitudinally upon the frame in the usual manner. C is the turret-base, resting upon the frame A, and D the turret, mounted upon the base C and adapted to turn in horizontal directions thereon, the construction and arrangement of all of these parts being substantially as shown and set forth in said Letters Patent No. 678,337. The joining of the turret-base and the turret with the frame is clearly shown in Fig. 2, the sleeve $b$ of the turret being within the hub $l^4$ of the turret-base, the latter hub occupying the hub $a$ of the frame.

E, Figs. 1, 2, 8, to 10, 12, and 13, is the tool-carrying arm, it being in one piece with the turret D, as shown, and having only horizontal motions upon the turret-base C, the vertical motions provided for in said Letters Patent being omitted.

G is a tool-carrying slide in the arm E, and I a crank connected with the slide G by a rod K, by means of which when the crank is turned the slide will be reciprocated in the arm E. The crank is rigid with a shaft L, Fig. 10, held eccentrically in a sleeve M, Figs. 1 and 10, rigid with the turret D, and provided with an overhanging bevel-gear S for operating the feed mechanism. A bevel sleeve-gear N, Figs. 1, 2, and 10, is fitted to turn upon the sleeve M, the construction and operation of these parts and the manner of driving the slide G being the same as set forth in the Letters Patent above referred to. A bevel-pinion $c$, Fig. 2, (shown by dots in Fig. 1,) engages the gear N, it being provided with a spur-gear $e^2$ turned by a driving-pinion $e$, and an intermediate $e'$, the pinion $e$ being rigid with a vertical shaft $f$ central in the sleeve $b$. The shaft $f$ is turned to operate the planer by the means shown and described in said Letters Patent, a bevel-gear $g$ being employed on the lower end of the shaft as therein shown.

F, Figs. 1, 2, 8, 9, and 10, is a horizontal overhanging rest for the outer free end of the arm E, the latter being formed with a downward-projecting part $k$ to meet the rest and slide therealong as the arm is moved forward or backward by the feed and the returning mechanism. This rest bears directly upon the frame A and is held in place by a clamping-bolt $h$, occupying and adapted to traverse a circular slot $i$ in the frame, whereby the rest may be shifted in circular directions upon the frame.

O, Figs. 1, 2, 4, 7, 12, and 13, is a tilting shaft held in a bearing P, rigid with the arm E, and passing horizontally through a projecting part of the slide G, this shaft being parallel with said arm E. Rigid with the outer end of the shaft O is a laterally-projecting flare-arm R, (see Fig. 3,) adjacent to and coacting with which is a form-rider T, in two parts or branches $p\ p'$, Figs. 5 and 6, secured in place by a screw $l$, threaded centrally in the end of the shaft, upon which screw the branches $p\ p'$ are adapted to turn.

U, Figs. 1, 2, 8, 9, and 10, is a controlling-form held by bolts $m\ m$ to an extended part $n$ of the rest F in position to control the branches $p\ p'$ of the rider T. This form U is made with a deep opening $r$ in one edge, having two similar opposing curved edges $s\ s'$, as shown, constituting forms for the teeth, the advance of the arm E during its feed motions causing the rider T to be carried into the opening $r$, as shown in Fig. 9, the two branches $p\ p'$ being closed together. The flare-arm R is formed with holes $t\ t'$ and the branches $p\ p'$ of the form-rider have similar holes $u\ u'$ in such positions that a dowel-pin $v$, Figs. 4, 8, and 9, may be passed through the holes $u\ t$ to cause the flare-arm and the branch $p$ to move as one piece or through the holes $u'\ t'$ to cause said arm and the branch $p'$ to move together. When either branch of the rider T is temporarily connected with the flare-arm, as stated, the other branch idles.

From the foregoing description of the mechanism it will be understood that if the parts be in the positions shown in Fig. 8 and the arm E be then moved toward the left, as in feeding, it will carry the form-rider into the opening $r$ in the form, the parts assuming the positions shown in Fig. 9. As the rider enters the form the branch $p$, gliding in under the form edge $s$, will be gradually depressed at its outer end, and so turn the flare-arm R downward, the pin $v$ being in place, causing the shaft O to correspondingly turn in the bearing P. Also when the arm E is returned to its original position (shown in Fig. 8) the shaft O will be turned back to its original position by the action of a weight V, Figs. 2, 8, and 9, connected by a cord $w$ on a wheel $v'$ (see Fig. 1) with a pin $x$ in the hub of the flare-arm R, the latter and the branch $p$ again assuming their positions shown in Fig. 8.

The slide G has an upwardly-extended curved part $y$ formed with a cylindrical concave face $y'$, Figs. 12, 13, and 14, for holding the tool-stock H, the latter being formed with a circular or convex part $z$ (see Figs. 13 to 16) to rest in the hollow of the part $y$ against the face $y'$. The part $z$ is also formed with a cylindrical concave face or side $z'$, $d$ being a plano-convex block or body fitted to the concave side $z'$ of the annular part $z$ of the tool-stock and held to place by a stout screw $a'$, Figs. 2 and 14, passing through a slot $b'$, Figs. 14 and 16, in said part $z$ and threaded in the extended part $y$ of the slide G. The surfaces in contact of the coacting parts $y\ z\ d$ are truly cylindrical, the curved surfaces $y'$ and $z'$ being concentric, on account of which the tool-stock may move or turn upward or downward to the positions indicated by full and dotted lines in Fig. 12, the annular part $z$ of the tool-stock during these motions sliding between the block $d$ and the slide G, these motions of the tool-stock being permitted on account of the slot $b'$ in the part $z$.

A circular toothed rack $c'$, Figs. 1, 2, and 12, is secured to the free end of the annular part $z$ of the tool-stock, which is engaged by a toothed segment $d'$ on the tilting shaft O. The segment $d'$ is formed with a hub or sleeve $i'$, Figs. 2 and 13, extending through the adjacent part of the slide G and provided with a retaining-collar $k'$ at its projecting end.

Thus joined, the sleeve or hub $i'$ can have no endwise motion in the slide G, but it may turn freely therein. The shaft O is formed with a spline $l'$, the sleeve $i'$ having a corresponding keyway $m'$ to receive the spline, as shown. On account of this construction of the parts it will be understood that as the crank I is turned to move the slide G along the arm E the toothed segment $d'$ will be caused to slide forward and backward along the shaft O, but will turn with the shaft. Thus when the shaft is turned by the action of the form U upon the branch $p$ of the form-rider or by the action of the weight V, as above set forth, the tool-stock will be turned upward or downward around upon its bearing in the slide G, as indicated.

The tool $o$ is a truncated wedge when viewed as from the cone-center of the machine. The slant of the two cutting edges is determined by the particular curvature of the tooth—that is to say, the larger the diameter of the gear the more nearly does the curved face of the tooth approach a plane, said curved face of the tooth of a gear of small diameter bending away more sharply from a plane. This being the case the two slant sides of the cutting-tool, converging toward the point, must converge more rapidly for forming the teeth of a gear of small diameter than for forming the teeth of a gear of large diameter. The tool shown is about the average form.

The cutting-tool $o$ is accurately formed and precisely set in the tool-box $f'$ of the tool-stock H, Figs. 1, 2, and 10, so that for forming or finishing the upper surfaces of the teeth $A^2$ of the gear $B'$, Figs. 17, 18, and 19, the lower corner $g'$ (see also Figs. 12 and 13) of the point of the tool will be exactly in the horizontal center line or axis of the curved surfaces $y'$ $z'$ of the parts $y$ $z$ $d$, above mentioned, which center line is also, in all positions of the tool-stock and the slide, radial with the cone-center of the machine. On account of this, it will be understood, said corner $g'$ of the tool will not be moved or shifted from its position in said center line by any of the circular or rocking motions of the tool-stock produced by the action of either the form U or the weight V, said corner $g'$ being at the center of all of these motions, and it will also be understood that the corner $g'$ of the tool, while moved by the action of the crank I in lines radiating from the cone-center of the machine, will also always be in the horizontal plane common with said cone-center, while the arm E carries the tool forward and backward on account of the action of the feed and the returning mechanisms. Viewed as in Figs. 11 and 17 to 19 this horizontal plane and the path of the motions of the corner $g'$ of the tool appear as a right line $w'$, (shown by dots and dashes,) the corner $g'$ while the tool is acting upon the upper surface of a tooth $a^2$ never deviating from this line during its feed and its retrogressive motions. The position of the tool $o$ in the tool-stock is at right angles with the radial line followed by its point during its reciprocations, and the rocking motions of the tool above described are in a plane at right angles with said radial line.

The cutting-tool $o$ is formed with two long cutting edges $n'$ $o'$, Fig. 17, to act during different operations of the machine upon the two sides of the teeth, and when it commences work at the point of the tooth, as shown in said figure, the point of the tool is elevated, (see also Figs. 12 and 13,) the lower cutting edge $o'$ acting upon the tooth. When the tool finishes at the base of the tooth, its point inclines downward, as shown in Fig. 19, Fig. 18 showing the position of the tool when midway along the face of the tooth. The positions of the tool at the beginning and the finish of each forward stroke or cut of the tool along the tooth are shown in each of Figs. 17, 18, and 19 by full and by dotted lines, respectively, and it will be seen that the point of contact of the tool against the tooth gradually approaches the corner $g'$ as the tool moves forward from the big end to the little end of the tooth, shaping the latter so that every longitudinal line along the face of the tooth shall be radial with the cone-center of the machine.

The description of the operation of the cutting-tool has been so far mainly with reference to its work on the upper curved side of the tooth. The work of the tool on the lower faces of the teeth is similar, only that its inclined positions are reversed, as shown in Fig. 11, and the upper corner $h'$ of its point instead of the lower corner $g'$ is brought into the horizontal plane of the cone-center. The tool, usually held, primarily, in a clamp box or holders $b^2$, Figs. 2 and 10, and placed, as shown, in a rectangular opening through the tool-box $f'$, is secured in place by the ordinary binding-screw $c^2$, threaded in the tool-box. The tool-box $f'$ is constructed to turn in horizontal directions in its seat in the tool-stock around a tapered swivel-pin $d^2$ in the usual manner, these motions being in a plane at right angles with the plane of the rocking motions of the tool-stock above set forth. The tool, together with the clamp-holders $b^2$, is lowered in the box $f'$ for working on the under surfaces of the teeth by removing a flat plate $f^2$ from beneath the holders $b^2$ and placing it above them, this plate having a thickness just equal to the width of the point of the tool $o$. Also when forming the under surfaces of the teeth the dowel-pin $v$, Figs. 4, 8, and 9, is inserted through the hole $u'$ in the branch $p'$ of the form-rider and the hole $t'$, Fig. 3, in the flare-arm R. On account of this the lower edge $s'$ of the form U controls the tilting shaft O when the feed motion of the arm E carries the form-rider into the opening $r$ in the form U, the upper arm $p$ of the form-rider idling. When the machine is working in this manner, the weight-cord $w$ is also carried over the hub of the flare-arm and attached to a pin $x'$, Figs. 8 and 9.

The rocking motions of the cutting-tool, determined and controlled by the contours of the edges $s$ and $s'$ of the form U, cause correct forms to be given the curved sides of the teeth $a^2$, different forms U and cutting-tools being employed in the machine for different-sized gears and teeth. Also for forming the teeth of gears B' of different shapes and diameters the tool-carrying arm E and the rest F are correspondingly shifted around the axis of the center shaft $f$, Fig. 2, in these movements, said arm and rest moving together.

The indexing of the spindle P' and the gear B' is done in this machine preferably in the manner and by the means and mechanism shown and set forth in said Letters Patent No. 678,337, the worm-gear R', Fig. 1, being employed on the spindle, as shown in said patent. Also the method of driving the machine, the feed mechanism, and the means for giving the tool-carrying arm its retrograde movements are the same, as shown and fully set forth in said Letters Patent—that is to say, the manner of driving the machine, the indexing, the feed, and the returning of the tool-carrying arm form no part of my present invention, and in this invention I do not confine myself to any particular method or mechanism for accomplishing these results.

What I claim as my invention, and desire to secure by Letters Patent, is—

1. A gear-planer having a tool-carrying arm, a reciprocating slide held by the arm, a tool-post on said slide for holding a cutting-tool having a straight cutting edge arranged to shape the side of a gear-tooth, and means for swinging the tool-post to carry the cutting-tool around an axis at right angles to said cutting edge and passing through the extremity thereof.

2. A gear-planer having a tool-carrying arm, a reciprocating slide held by the arm, a tool-post on said slide for holding a cutting-tool having a straight cutting edge arranged to shape the side of a gear-tooth, means for swinging the tool-post to carry the cutting-tool around an axis at right angles to said cutting edge and passing through the extremity thereof, comprising a shaft held by the slide and operatively connected to said tool-post and means for turning said shaft.

3. A gear-planer having a tool-carrying arm, a reciprocating slide on the arm, a tool-post held movably by the slide, a shaft held by the slide and the tool-carrying arm, and means for turning the shaft and the tool-post, substantially as and for the purpose set forth.

4. A gear-planer comprising a tool-carrying arm, a reciprocating slide on the arm, a tool-post held movably by the slide, a toothed segment on the tool-post, a shaft passing through the slide, a toothed segment on the shaft to engage the toothed segment on the tool-post, and means to turn the shaft, substantially as and for the purpose set forth.

5. A gear-planer comprising a tool-carrying arm, a reciprocating slide on the arm, a tool-post held movably by the slide, a shaft held by said arm and the slide to control the tool-post, an arm on the shaft, a form, and a rider for the form to control the shaft, substantially as described.

6. A gear-planer comprising a tool-carrying arm, a reciprocating slide on the arm, a tool-post held by the slide, a shaft held by the tool-carrying arm, an arm on the shaft, a form, and a rider for the form, having branches, substantially as shown and described.

7. A gear-planer having a tool-carrying arm, a reciprocating slide on the arm, a tool-post held by the slide, a shaft held by the tool-carrying arm, an arm on the shaft, a form, and a rider for the form, having movable branches, and means for securing said branches alternately to said arm on the shaft, substantially as set forth.

8. A gear-planer having a tool-carrying slide formed with a concavity, a tool-post having a convex part to occupy said concavity, formed with a concave side, a convex body to occupy said concave side of the tool-post, and means for holding the parts together, the tool-post being movable in the slide, substantially as set forth.

9. A gear-planer having a tool-carrying slide formed with a concave part, a tool-post having a part formed with a slot, convex on one side and concave on the other, to meet said concave part of the slide, a body having a convex side to meet the concave side of the tool-post, and a clamping-screw piercing said convex body and the tool-carrying slide and passing through the slot, substantially as shown and described.

In witness whereof I have hereunto set my hand, this 13th day of May, 1902, in the presence of two subscribing witnesses.

JAMES E. GLEASON.

Witnesses:
 ENOS B. WHITMORE,
 MINNIE SMITH.